United States Patent [19]

Musgrave

[11] 4,242,029

[45] Dec. 30, 1980

[54] POULTRY COOP HANDLING SYSTEM

[76] Inventor: Harry J. Musgrave, P.O. Box 214, Nashville, Ark. 71852

[21] Appl. No.: 763,797

[22] Filed: Jan. 31, 1977

[51] Int. Cl.³ .............................................. B65B 21/02
[52] U.S. Cl. .................................... 414/413; 414/123; 414/33; 198/407; 198/412
[58] Field of Search ........ 214/307, 306, 311, 317–318; 119/82; 198/402, 406–407, 412, 459, 461; 414/413, 414, 418, 424, 425, 33, 123

[56] References Cited

U.S. PATENT DOCUMENTS

| | | | |
|---|---|---|---|
| 2,161,836 | 6/1939 | Stevenson | 214/306 X |
| 2,498,740 | 2/1950 | Miller | 214/306 |
| 2,619,238 | 11/1952 | Miller | 214/306 |
| 2,677,452 | 5/1954 | Mallow | 198/402 |
| 2,707,060 | 4/1955 | Nawman | 214/306 |
| 2,716,500 | 8/1958 | Criger | 214/306 |
| 3,360,103 | 12/1967 | Johnson | 198/402 |

FOREIGN PATENT DOCUMENTS 151673  8/1951  Australia .................................. 214/306

OTHER PUBLICATIONS

D. D. Loving, "No hands system removes maiell birds from coops"–Poultry and Eggs Marketing, Dec. 21, 1974.
D. D. Loving, "Coop unloading system undergoing tests," The Poultry Times, Dec. 19, 1974.
"New system could save $ $ at the dock"–Poultry Meat, Jan. 1975, p. 56.
Broiler Industry; "Two coop unloaders can handle 100,000 birds a day"; pp. 21 and 22; Oct., 1976.

Primary Examiner—Stephen G. Kunin
Assistant Examiner—R. B. Johnson
Attorney, Agent, or Firm—Arnold, White & Durkee

[57] ABSTRACT

An apparatus for receiving a plurality of tiers of poultry coops containing live birds at an unloading area and automatically handling the coops to unload the birds therefrom at a location outside the hang room. A lay down unit accepts the coops one tier at a time and tilts it from an upright disposition to an inclined disposition, laying the coops down on an inclined conveyor that moves the coops to the end of the incline. The lead coop falls over the end and into a coop unloading unit having a saddle adapted to catch the coop and hold it suspended above an auxiliary conveyor, permitting the coop door to freely open and discharge the birds. A mechanism within the unloading unit moves the coop out of the saddle and onto a coop elevator, causing the coop door to automatically close. A coop elevator takes the coops to a coop inverter which turns each coop over. The coops move to a restack station provided with an outfeed conveyor. The apparatus includes pneumatically controlled hydraulic motors and cylinders for operating the various components of the apparatus, with a pneumatic control circuit providing remote control of the apparatus from the hang room.

9 Claims, 7 Drawing Figures

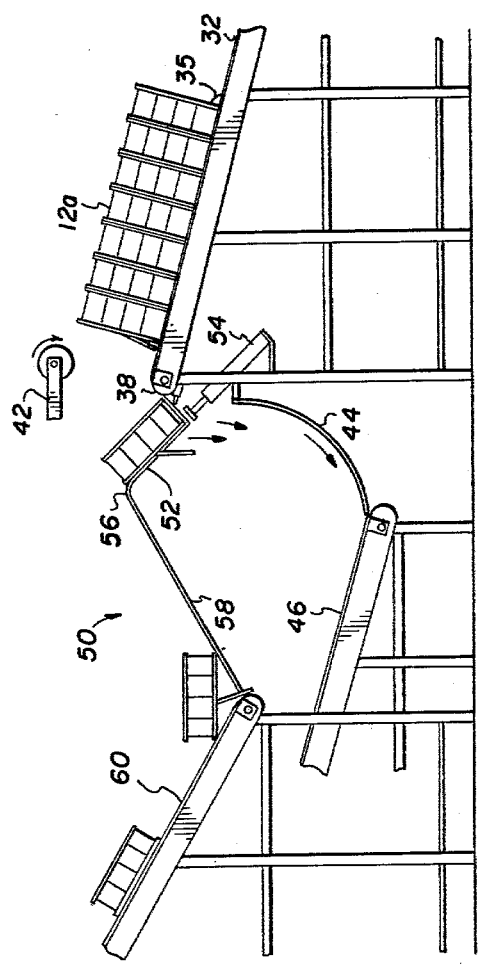
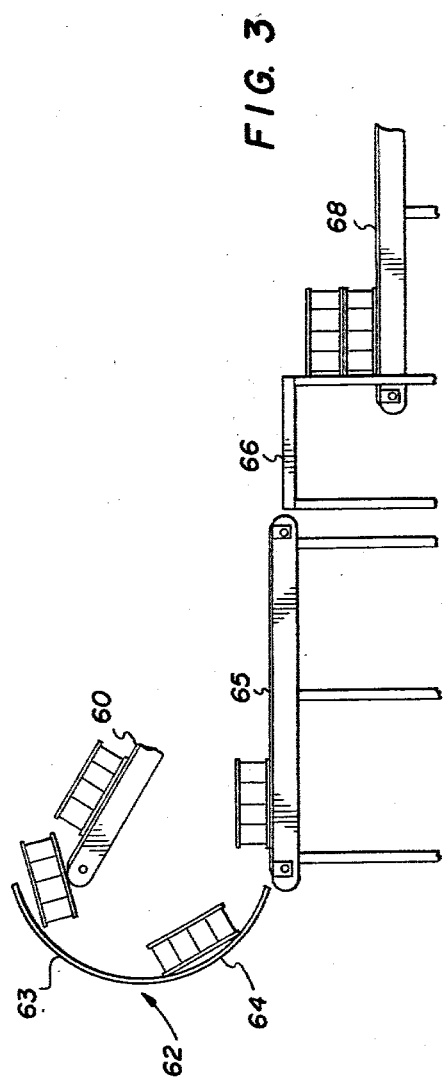

POULTRY COOP HANDLING SYSTEM

BACKGROUND OF THE INVENTION

1. Field of the Invention

The present invention relates to an apparatus for handling stacks of poultry coops containing live birds; and more particularly, it relates to an apparatus for handling stacks of poultry coops outside the processing area to automatically remove the birds from the coops and route the coops to a restacking station.

2. Prior Art

Heretofore, in the handling of poultry coops containing live chickens or the like brought to a poultry processing plant, it has been the case that the coops are removed from a trailer with a fork lift and manually onto a conveyor that moves the coops into the processing area of the plant. Inside the processing plant, the coops are opened and the birds manually removed. As a consequence of this technique for unloading poultry coops, a large number of people are required at the unloading dock and in the processing area. Also, as a result of the need to speed the unloading of coops, rough handling typically results creating a risk of damage to the birds and to the coops.

One attempt to alleviate the problem of high labor and damage in connection with the handling and unloading of poultry coops brought to the processing plant is the poultry coop unstacking machine disclosed in U.S. Pat. No. 3,891,097. There is disclosed an apparatus for receiving tiered stacks of poultry coops at an unloading area, conveying them one tier at a time, and unstacking each tier onto a distribution system that carries the coops into the poultry processing plant. More specifically, the poultry coop handling apparatus disclosed therein receives stacked coops on a conveyor. The tiers of coops are conveyed single file to a lift platform where each tier is elevated. As the tier reaches the top of the elevator tower, the top coop is engaged by a belt and wheels moving it onto a conveyor. After each coop is so moved, the elevator descends to pick-up another tier. The unstacked coops are then conveyed into the processing plant without manual effort.

Although this apparatus obviates some labor in the handling of the coops, much man power is still required in the overall operation which also involves removing the birds from the coops and readying the coops for restacking. Accordingly, a poultry coop handling system for use at a processing plant which substantially automatically receives coops, removes the birds therefrom, and routes the coops to a place for restacking would be highly desirable.

SUMMARY OF THE INVENTION

The instant invention provides the poultry processing industry with apparatus for efficiently handling poultry coops brought to a processing plant to remove the live birds from the coops outside the processing area with less labor than previously has been required and with less damage to the birds or the coops. The instant invention receives loaded poultry coops in stacked tiers and serves to automatically unstack the coops, unload the birds, and route the coops to a place where they are restacked.

One advantage of the instant invention over prior art coop handling systems is that the coops no longer enter the hang room or shackle area of the processing plant; only the birds are conveyed into the processing area.

Another advantage of the instant invention is that a substantial reduction in the manpower needed in connection with the handling of poultry coops and the removal of the birds therefrom at the processing plant may be realized by virtue of the substantially automated operation of the apparatus.

The apparatus of this invention receives loaded poultry coops removed from a trailer with a fork lift and serves to automatically remove the birds from the coops, one coop at a time, for delivery to the hang room, and transmit the empty coops to a restack station.

Tiers of poultry coops of a height compatible with the capacity for which the apparatus is designed to handle are stacked on an infeed conveyor. The tiers of coops are moved along in single file by the infeed conveyor which is under the control of hang room personnel. A separation conveyor aligned with the infeed conveyor, and moving at a greater travel rate, pulls the lead tier away from the other incoming tiers, with the lead tier activating a control device, such as a valve, to stop the infeed conveyor.

The separation conveyor moves the tier of coops onto a lay-down unit comprising an L frame that is mounted at the end of the separation conveyor. The L frame is adapted to receive a tier of coops and is pivoted for movement between an upright position and an inclined position. When a tier of coops is resting on the L frame, another control device is depressed activating a hydraulic cylinder connected to the L frame to pivot the L frame into the inclined position. As the L frame is pivoted down, another control device halts movement of the separation conveyor.

The L frame lays down the stack of coops on an inclined conveyor and activates the conveyor. The inclined conveyor is a dogged conveyor which moves the coops to the end of the incline. The conveyor continues to run transporting the coops to the crown until the last coop is carried up and a control device is tripped, which also causes the hydraulic cylinder to raise the L frame to its upright position. As the stack of coops is transported to the end of the inclined conveyor, the lead coop is pulled away from the trailing coops by an accelerator wheel. The wheel is disposed above the end of the inclined conveyor to engage the top side of the lead coop and tilt it over as it falls over the end.

Each coop as it falls over the end comes to rest in an unloading unit comprising a saddle which supports the coop such that the coop door is free to open and the birds fall out onto a conveyor disposed beneath the unloading unit. As a coop comes to rest in the unloading saddle, a control device activates a mechanism for pushing the coop onto a coop elevator. The mechanism can be for example, an air cylinder having a push rod that extends from the cylinder and pushes against the back side of the coop. The coop door remains open until the coop is pushed onto the coop elevator, which closes the coop door.

In a specific aspect of the invention, the unloading unit has two inclined coop support portions meeting to form a ridge or hump over which a coop must be pushed before reaching the coop elevator. One inclined portion serves as a slide directing the coops to the coop elevator. This arrangement has the effect of rocking a coop from one end to the other to assure that all the birds have been emptied from the coop.

The coop elevator takes the empty coops which are spaced apart and disposed upside down, to a coop inverter which turns the coops over. The coops fall by gravity down a slide to a restack station manned by a restack station operator who puts the coops onto an outfeed conveyor.

In a specific aspect of the instant invention, the conveyors are driven by hydraulic motors controlled by pneumatically actuated valves. The speeds of the infeed, separation, and inclined conveyors may be varied and adjusted to the demand capacity of the hang room or slightly greater.

The conveyors in the apparatus comprise a pair of endless chains trained about opposed sprockets secured on shafts that are carried in bearings on the frame of the conveyor adjacent the ends thereof, and the drive motors used are hydraulic having a drive sprocket for engaging the endless chain on each conveyor. A control mechanism controls the various hydraulic motors and cylinders to sequence the operation thereof and provide automatic operation of the apparatus. The control mechanism is adapted to provide control signals to flow control valves in series with each of the hydraulic motors, cylinders and other components. Preferably, the signals are pneumatic pressure signals that operate the flow control valves between open and closed positions, and the control mechanism is a pneumatic circuit utilizing limit valves and internal interlocks to sequence operation of the various portions of the apparatus. Among the most important features of the pneumatic circuit is the provision for remote control of the apparatus from the hang room.

The pneumatic control circuit receives a supply of air available from a compressor. The pneumatic circuit is activated by a remote stop/start valve located in the hang room. Activation of this valve results in immediate operation of the coop elevator as its flow control valve is opened by a pneumatic signal generated by the pressurizing of the circuit.

The infeed conveyor operates with a normally-open valve supplying a flow of hydraulic fluid to its drive motor. Movement of the infeed conveyor stops when the lead tier engages and closes a limit valve proximate the separation conveyor. Closure of that value generates a pneumatic signal that closes the flow control valve for the motor driving the infeed conveyor.

At the end of the separation conveyor, where the tier is placed onto the L frame, another limit valve is closed which produces pneumatic signals to the hydraulic cylinder that pivots the L frame. The pneumatic signals are supplied to a double-directional valve which is positioned to apply hydraulic fluid to the cylinder causing it to retract. Retraction of the cylinder causes the L frame to lay down on the inclined table. As the L frame begins to pivot, a limit valve is released causing it to open and remove the pneumatic signal from the flow control valve for the separation conveyor motor. With removal of the signal, the flow control valve opens and the motor stops.

When the L frame reaches its final resting position at the inclined conveyor, a limit valve is actuated generating pneumatic signals which open the flow control valves for the inclined conveyor and the accelerator wheels. Opening of the flow control valves starts the motors running.

The L frame remains in the down position until a dog on the inclined conveyor, which pushes against the last coop in the stack, engages and opens a limit valve. Opening of the valve removes the pneumatic signals to the double-directional valve that operates the hydraulic cylinder, with that valve assuming its normal position wherein hydraulic fluid is applied to the cylinder in such a manner as to cause it to extend. Extension of the hydraulic cylinder pivots the L frame back to its upright stack receiving position.

As the L frame lifts, the limit valve on the inclined conveyor is released causing it to open. This removes the pneumatic signals from the flow control valves for the inclined conveyor and the accelerator wheels, closing the same with the subsequent halting of movement of those portions of the apparatus. Upon reaching its upright position, the L frame re-engages the limit valve that produces the pneumatic signal for starting the separation conveyor motor.

The coop elevator runs independently subject only to a manually operated override valve and to the remotely controlled start/stop valve.

These and other aspects of the invention will be more fully explored in the description of a preferred embodiment of the instant invention which follows.

BRIEF DESCRIPTION OF THE DRAWINGS

In order that the invention may be more clearly understood, it will be explained more fully with particular reference to the embodiment illustrated in the accompanying drawings wherein:

FIG. 2 is an elevation view of the poultry coop unloading unit, illustrating its relation to an auxiliary conveyor for the unloaded birds;

FIG. 3 is an elevation view of the coop invension unit in conjunction with the outfeed portion of the apparatus;

DESCRIPTION OF A PREFERRED EMBODIMENT

Figure 1:
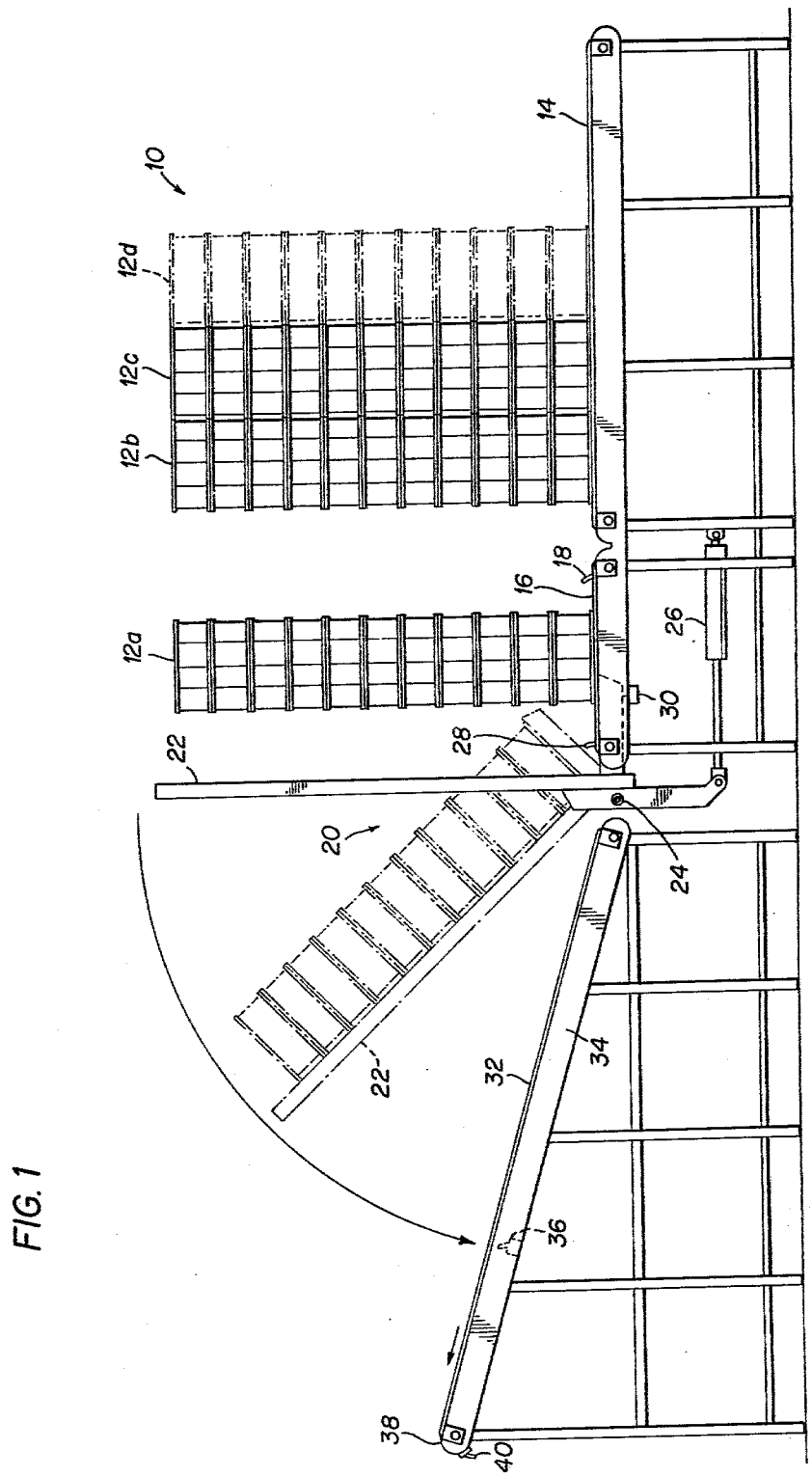
FIG. 1 is an elevation view of infeed portion of the apparatus in conjunction with the lay down unit.

Referring to FIGS. 1–3 of the drawings, and more particularly to FIG. 1, one specific embodiment of an apparatus for receiving tiers of poultry coops containing live birds at an unloading area outside a poultry processing plant and automatically handlling the same to unload the birds from the coops outside of the hang room of the processing plant, which apparatus is in accordance with the present invention is shown.

In FIG. 1, a number of tiers of poultry coops referenced as 12a–12d are placed on an infeed conveyor 14 in a single file arrangement by, for example, a forklift that unloads the tiers of coops from a truck. Although four tiers of eleven coops each are shown in FIG. 1, it is to be appreciated that the number of coops in each tier may be more or less than eleven depending upon the dimensions of the apparatus.

The tiers of poultry coops are conveyed horizontally by conveyor 14 which is controlled remotely by an operator in the hang room where the birds once unloaded from the coops are received. A hydraulic motor with pneumatic control (see FIGS. 4-7) is utilized to provide the driving power to move conveyor 14. Although the specifics of conveyor 14 are not shown in FIG. 1, conveyor 14 may be a conventional conveyor system wherein a hydraulic motor is coupled to a chain, which bears the weight of the infeed load, by a sprocket that engages the chain and transmits motion thereto.

The tiers of coops are conveyed along on conveyor 14 toward a separation conveyor 16 of similar type, though shorter, which is driven by a hydraulic motor to move in the same direction as conveyor 14 but a higher speed. Separation conveyor 16 by virtue of its higher speed separates the lead tier 12a from the remaining tiers of coops. As the lead tier 12a of coops is pulled onto separation conveyor 16, a control device 18, such as a limit valve, acting as a position sensor is engaged. Through the pneumatic control circuit to be described later, movement of conveyor 14 is stopped, with the remainder of the tiers held in readiness.

Separation conveyor 16 continues moving lead tier 12a horizontally and moves it into position on a tier receiving and laydown unit 20 which comprises an L frame 22 mounted for pivotal movement between an upright position and a reclining position. L frame 22 is pivotally mounted on a supporting frame for movement about an axis 24 by hydraulic cylinder 26 that is actuated into operation when the lead tier 12a engages control device 28. A control device 30 senses the upright tier receiving position of L frame 22 and stops conveyor 16 upon the start of the down cycle of the laydown unit 20.

The laydown unit 20 continues in its down cycle until the tier of coops in position thereon is laid upon inclined conveyor 32. In this portion of its operation, the laydown unit comes to rest between the parallel rails 34 of the inclined conveyor 32 and beneath the chain deck thereof in order to place the coops thereon. As it comes to rest, L frame 22 engages control device 36 initiating motion of conveyor 32.

Conveyor 32 is also a conventional conveyor having a chain engaged by a sprocket on a hydraulic motor to drive the conveyor up the incline. The chain has a dog 35 (FIG. 2) thereon to engage the bottom side of the lower most coop to push the stack toward the end 38 of inclined conveyor 32.

FIG. 2 illustrates an additional portion of the apparatus 10 and includes another view of the upper portion of inclined conveyor 32. In particular, however, FIG. 2 illustrates and presents for discussion the poultry coop unloading unit generally referenced by numeral 50. The unloading unit receives each coop as it falls from the end of the inclined conveyor 32 and supports the coop, permitting the coop door to open and discharge the birds from the coop, and then automatically send the coop over to coop elevator 60 causing the coop door to automatically close.

Before entering into a discussion of the poultry coop unloading unit 50 itself, attention should once again be directed to inclined conveyor 32, particularly the end thereof over which the lead coop in each tier falls. To facilitate and assure that each coop will properly fall over end 38 an accelerator wheel 42 is disposed proximate the end of inclined conveyor 32 in order to pull the lead coop away from the trailing coops and tilt the coop as it falls over end 38. Inclined conveyor 32 continues to run pushing coops to end 38 until dog 35 trips control device 40 to signify that all of the coops have been removed from conveyor 32, whereupon L frame 22 is pivoted into its upright stack receiving position by cylinder 26. When L frame 22 reaches it upright position it will engage control device 30 (see FIG. 1) causing infeed conveyor 14 to start up again, subject to the overriding control command of the remote hang room operator.

The lead coop that falls over end 38 is caught and comes to rest in a saddle 52 adapted to support the coop, yet permit the coop door to freely swing open. For example, saddle 52 may comprise two parallel rails spaced apart an appropriate distance to support the coop along its periphery with the center being unobstructed to the opening of the coop door. As each coop falls into saddle 52, a control device (not shown) activates an air cylinder 54 mounted beneath end 38 and so disposed as to engage the back end of a coop that is resting in saddle 52. Upon actuation, cylinder 54 slowly extends and pushes the coop over a hump 56 and onto an inclined slide portion 58 that leads to coop elevator 60. The inclined slide 58 is similar to saddle 52 and really may be considered an extension thereof in that it includes spaced parallel runners that permit the coop door to remain open and supports the coop along its sides.

After a coop is moved out of saddle 52, it slides down incline 58 to coop elevator 60. When the coop reaches coop elevator 60, the coop is carried forward. As the coop is pulled onto the coop elevator 60, the door of the coop is engaged by the end of the elevator 60, as shown in FIG. 2, and is forced toward the close position when the coop drops, such action effectively serves to automatically close the coop door. The coop continues to be pulled by elevator 60 which moves each coop along.

Referring once again to the saddle portion of poultry coop unloading unit 50, it will be noted that a chute 44 is disposed directly beneath to receive the live birds as they are discharged from the coop, and direct them onto a conveyor belt 46 which takes the live birds into the hang room.

Referring next to FIG. 3, there is shown the upper end of coop elevator 60 which feeds coops to a coop inverter 62. Once into the inverter 62, which comprises inverter head 63 and slide 64, each coop is guided downwardly through inverter head 63 and falls by gravity onto a slide 64 that directs the coop to the restack stand 66 over a series of rollers held in table 65. An outfeed conveyor 68 is provided onto which the empty coops can be stacked into tiers and moved out onto a dead track (not shown) where they may be readied for forklift pickup.

As mentioned previously, the conveyors 14, 16, 32 and 68 are conventional conveyors having a pair of endless chains trained about opposed sprockets secured on shafts that are carried in bearings on the frame of the conveyor adjacent the opposite ends of each. Also as previously mentioned, a hydraulic motor having a drive sprocket for engaging the endless chain on each conveyor is provided to supply power and cause the conveyor to move whenever the motor is activated.

Figure 4:
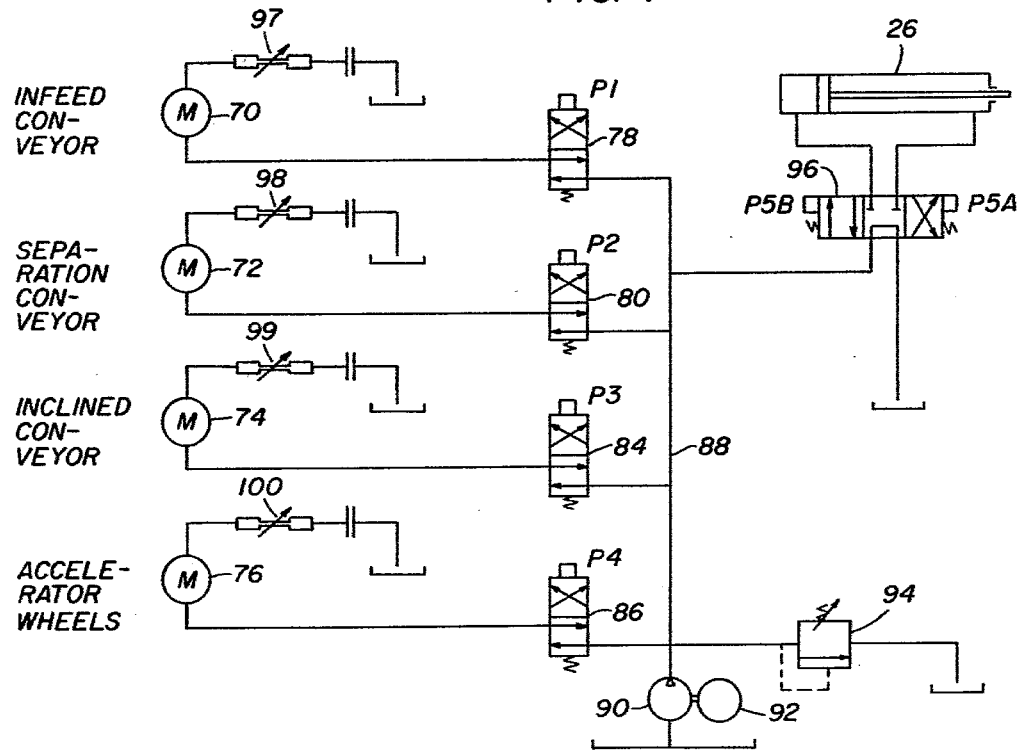
FIGS. 4–7 are schematic diagrams of the hydraulic system for the apparatus and the pneumatic controls therefor.
Figure 5:
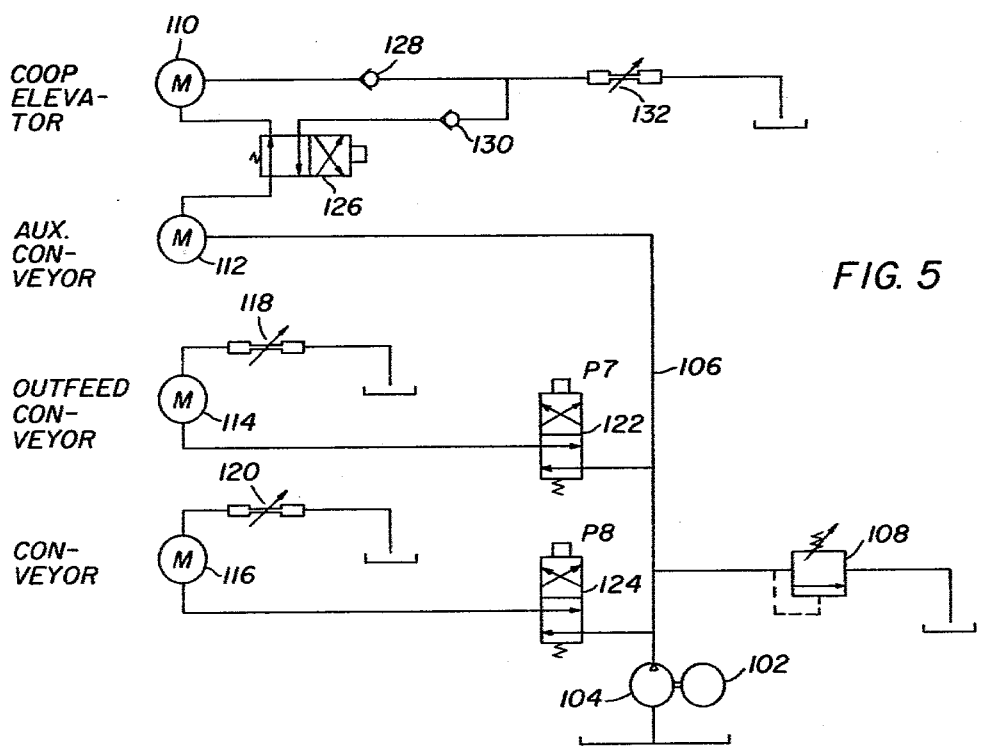
Figure 6:
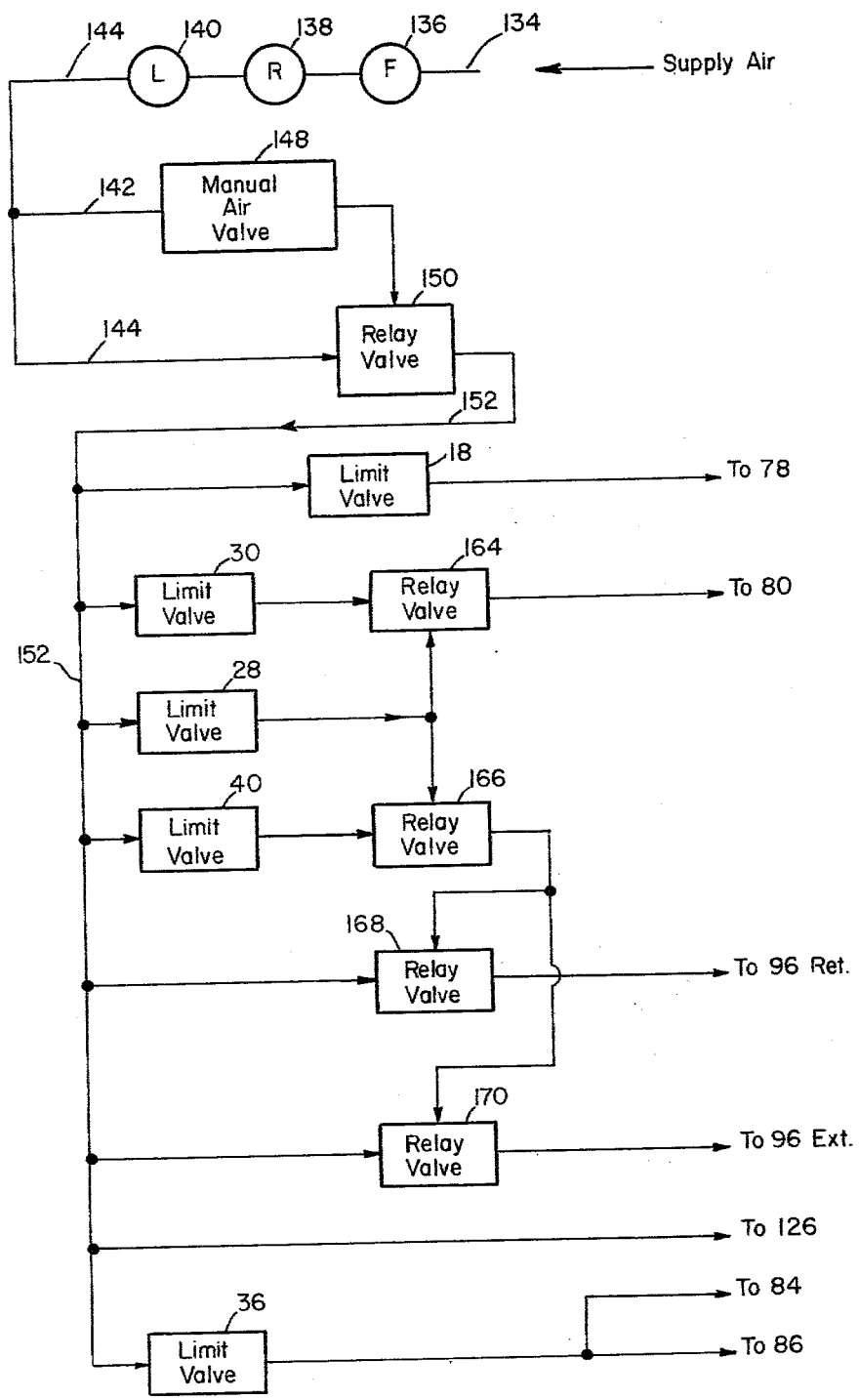
Figure 7:
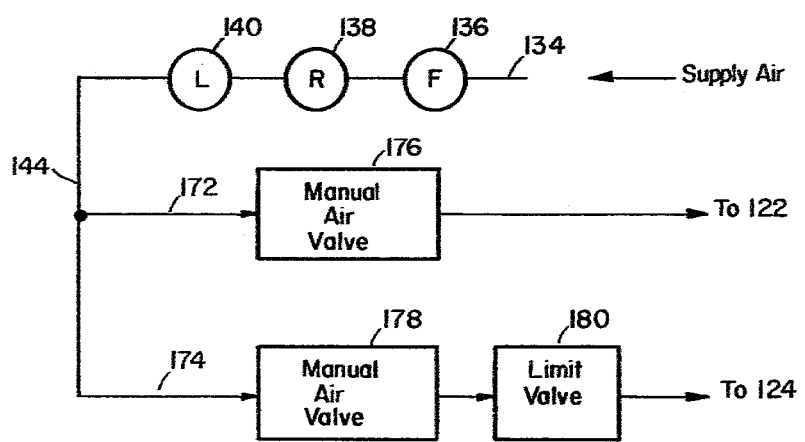

There is presented in FIGS. 4 and 5 the two hydraulic systems used in the coop handling apparatus, and in FIGS. 6 and 7 the pneumatic controls for the hydraulic systems are shown. Beginning with the hydraulic system in FIG 4, hydraulic motors 70, 72, 74 and 76 are provided for driving the infeed conveyor 14, the separation conveyor 16, the inclined conveyor 32 and accelerator wheel 20, respectively. Activation of each of the motors is by means of a single directional flow control valve. Specifically, valve 78 controls the flow of hydraulic fluid to motor 70, valve 80 controls the flow to motor 72, valve 84 controls motor 74 and valve 86 controls motor 76. Valves 78, 80, 84 and 86 receive pressurized hydraulic fluid though a manifold line 88 that is supplied by a hydraulic pump 90 driven by an electric motor unit 92. The pressure on line 88 is prevented from exceeding a predetermined value by a pressure relief valve 94.

In addition to supplying the hydraulic fluid to motors 70-76, line 88 also supplies pressurized hydraulic fluid to retractable hydraulic cylinder 26, shown in schematic outline. A double-directional valve 96 controls the flow of fluid to hydraulic cylinder 26 to extend and retract the same.

Each of the hydraulic flow paths for motors 70-76 has a series flow rate control device 97-100 that provides speed adjustment for the motors by regulating the rate of hydraulic fluid flow through the respective motor. The speed setting for motors 70-74 are the speed adjustments that set the output of the unloading apparatus 10, and determines the number of tiers that may be handled within a given time interval.

Flow rate control devices 97-100 are conventional manually controlled variable valves which have an adjustable fluid flow area and serve as variable flow restricters. As the available fluid flow area or orifice of, for example, valve device 97 is reduced, the rate of fluid flow therethrough, and through motor 70 decreases. Since the speed of hydraulic motor 70 is proportional to the rate of fluid flow therethrough, the speed of motor 70 also decreases. Conversely, if the fluid flow area of valve device 97 is enlarged, the rate of fluid flow therethrough and through motor 70 increases, thereby increasing the speed of motor 70.

Turning now to the hydraulic system in FIG. 5, it will be observed that there is a similarity between the hydraulic system shown there and that of FIG. 4. For example, an electric motor unit 102 is provided for driving a hydraulic pump 104 that supplies pressurized hydraulic fluid to a manifold line 106. The pressure is kept constant on manifold line 106 by pressure relief valve 108.

As with the hydraulic system shown in FIG. 4, the system illustrated in FIG. 5 comprises four hydraulic motors 110, 112, 114 and 116. Hydraulic motors 114 and 116 are provided to drive restack conveyor and outfeed conveyor 68, respectively. The speed of each motor is set by flow rate control devices 118 and 120 serially arranged in the flow paths for motors 114 and 116 respectively. Control for motors 114 and 116 is provided by single directional valves 122 and 124 which control the on-off flow of pressurized fluid from manifold line 106 to the hydraulic motor that is connected to the respective valve.

Manifold line 106 also supplies pressurized fluid to motor 112 which is a continuously running motor, driving the auxiliary conveyor 46. Hydraulic motor 110 drives coop elevator conveyor 60. A flow control valve 126 along with flow check valves 128, 130 control the operation of coop elevator motor 110, and serves as a start-stop control for motor 110 only, having no effect on the operation of auxiliary conveyor motor 112. For example, in the position shown, hydraulic fluid from manifold line 106 is passed through motor 112 to motor 110 via valve 126. Flow back to the tank for the hydraulic system is through flow check valve 128. Consequently, both motors 110 and 112 are allowed to run. If, however, valve 126 is actuated to its other position flow from motor 112 is diverted around motor 110, through check valve 130, to the hydraulic tank. A common speed control in the form of a flow rate control device 132 is provided and controls the speed of both motors 110 and 112.

Flow rate control devices 118, 120 and 132 are conventional manually controlled variable valves having an adjustable fluid flow area or orifice and serve, like valve devices 97-100, as variable flow restricters, thereby enabling regulation of the rate of hydraulic fluid flow through respective motors 116, 114, 110, and 112 and consequently regulation of the speed of those motors.

Turning now to FIGS. 6 and 7, the pneumatic controls for sequencing the operation of the various hydraulic components will be described.

Referring first to FIG. 6, a supply of air is made available to air input line 134 from a supply source of compressed air. Connected in series are filter 136, regulator 138 and lubricator 140. Compressed air is continuously supplied into line 142 which leads to manual air valve 148, and into line 144, which leads to relay valve 150.

The pneumatic controls of FIG. 7 are activated by actuation of manual air valve 148 which applies an air control signal to the control input of normally open air valve 150 and causes closure thereof to feed compressed air forward therethrough from line 144 into manifold line 152. Limit valves 18, 30, 28, 40 and 36 are supplied with input compressed air from manifold line 152. Input compressed air to relay valves 168 and 170 is also supplied from manifold line 152.

Actuation of limit valve 18 supplies an air control signal to actuate valve 78 in FIG. 4. Actuation of limit valve 30 supplies an air control signal to relay valve 164 which receives the signal as input compressed air. Actuation of limit valve 28 supplies an air control signal to the control input of relay valve 164, which causes an air control signal to be output therefrom to actuate valve 80 in FIG. 4. The air control signal produced by actuation of limit valve 28 is also applied as the control input of relay valve 166. However, relay valve 166 cannot issue an output air control signal unless limit valve 40 has been actuated to supply input compressed air to the air input of relay valve 166.

When relay valve 166 does produce an output air control signal, the signal is applied simultaneously to the control inputs of both relay valve 168 and relay valve 170. Relay valve 168 is normally open and supplies an air control signal to actuate valve 96 in FIG. 4 to retract hydraulic cylinder 26. Relay valve 170 is normally closed and supplies an air control signal to actuate valve 96 in FIG. 4 to extend hydraulic cylinder 96 in the absence of an air control input signal from relay valve 166. When, however, an air control input signal from relay valve 166 is received by relay valve 170, it is opened, removing the air control signal from valve 96 in FIG. 4.

Actuation of limit valve 36 supplies an air control signal that is split and applied to both valve 84 and valve 86 in FIG. 4.

A direct air line from manifold line 152 to valve 126 in FIG. 5 is also established.

Referring next to FIG. 9, branch lines 172 and 174 are tapped off line 144, so air is being supplied in the same manner and indeed from the same source as in FIG. 8. Line 172 supplies a manual air valve 176 which, upon actuation, supplies an air control signal to in turn actuate valve 122 in FIG. 5 and initiate operation of outfeed conveyor motor 114. Line 174 supplies air to manual air valve 178 which, upon actuation, supplies air to the input of limit valve 180. Upon actuation of limit valve 180, an air control signal is applied to valve 124 in FIG. 5.

P1-P8 represent the interface between the pneumatic and hydraulic subsystems of FIGS. 6 and 7 and FIGS. 4 and 5, respectively, in implementation of the "air over hydraulic" control system which has air lines extending between the output of an air control valve (i.e., limit valve or relay valve) and the air control signal input of a respective hydraulic fluid flow control valve.

With the arrangement of the foregoing schematic diagrams in mind, a discussion of a cycle of operation of the apparatus, including the pneumatic controls, will be given. After the coops are set on the infeed conveyor 14, the apparatus may be set in motion by closing manual air valve 148, which results in the closure of control valve 150 and permits the manifold line 152 to become pressurized with air. As mentioned previously, infeed conveyor motor 70 is controlled by a normally open flow control valve 78. Thus, when air is supplied to limit valve 18, which is a normally closed valve permitting passage of air, infeed conveyor motor 70 runs. Infeed conveyor 14 continues to operate until the lead tier of coops is advanced up to separation conveyor 16, where the lead tier engages limit valve 18. Engagement of the lead tier of coops with limit valve 18 causes it to open, thus remaining compressed air to flow control valve 78, allowing it to move to the open position. This stops the running of infeed conveyor motor 70.

Separation conveyor 16 controlled by normally open valve 72 continues to run until the lead tier thereon engages limit valve 28, causing it to close which in turn closes valves 164 and 166. Closure of valve 166 in turn causes the closure of valve 168 and the opening of valve 170. It will be noted that valve 170 is a normally closed valve, and therefore, valve 96 in FIG. 4 is pressurized to hold the cylinder 26 in the extended position. However, with the closure of valve 168 and the opening of valve 170, double-directional valve 96 is changed in position such that cylinder 26 beings to retract. As will be noted from the discussion in regard to FIG. 1, retraction of cylinder 26 causes L frame 22 to pivot and thereby laydown the tier of coops onto inclined conveyor 32.

Limit valve 30, closes as the L frame begins to be lowered. Since valve 164 is also closed, flow control valve 80 in FIG. 4 which supplies fluid to separation conveyor motor 72 is moved to a closed position stopping the movement of separation conveyor 16.

When the L frame is fully down with the coops resting on inclined conveyor 32, and engages limit valve 36, motors 74 and 76 that drive the inclined conveyor and the accelerator wheel, respectively, begin running. The L frame remains in the down position until a dog on the chain of inclined conveyor 32 engages limit valve 40, thereby releasing valves 168 and 170 to assume their normal positions, which are normally open for valve 168 and normally closed for valve 170. As a consequence, valve 96 in FIG. 4 is shifted back to its original position with the cylinder beginning to extend. Extension of cylinder 26 will, of course, result in the lifting of L frame 22 back to its up-right tier receiving position, completing one full cycle of operation of the machine.

If manual air valve 148 is opened at any time by the remote operator, all motors are stopped, with subsequent restart beginning at the same place in the sequence of operation.

The foregoing description of the invention has been directed to a particular preferred embodiment for purposes of explanation and illustration. It will be apparent, however, to those skilled in this art that many modifications and changes in the apparatus may be made without departing from the scope and spirit of the invention. For example, the motors which drive the conveyors may be electrical rather than hydraulic. Also, the control apparatus for the motors may be a solid-state logic circuit rather than a pneumatic circuit. In addition, with appropriate changes in the lay down unit, an electric motor with a connecting linkage to the L frame can be substituted for the hydraulic cylinder. These, and other modifications of the invention will be apparent to those skilled in this art. It is the applicant's intention in the following claims to cover all such equivalent modifications and variations as fall within the true spirit and scope of the invention.

What is claimed is:

1. An apparatus for automatically handling poultry coops, each of which has a topside coop door and contains live birds, to empty the birds therefrom, comprising:

an input conveyor system for receiving poultry coops in a tier arrangement and transporting the tier of coops along a defined path;

a lay down unit for receiving the tier of coops from said conveyor in an upright disposition and forwardly tilting the tier into an inclined disposition;

an inclined conveyor for receiving the tier of coops from said coop lay down unit in the inclined disposition in which each coop lays on its side, and for conveying each coop to the end of the conveyor where it falls over the end and is tilted further forward;

a saddle for catching each coop as it falls over the end of the conveyor and holding it in the forwardly tilted orientation such that the topside coop door freely opens to discharge the birds therefrom;

means for ejecting an empty coop from said saddle;

a conveyor for receiving an empty coop after it is ejected from the saddle, the conveyor being adapted to receive an empty coop in an upside down orientation and effect closure of the coop door by contacting the coop door as the coop is being received; and a coop inverter for receiving a coop from said conveyor and turning the coop over to be topside up.

2. The apparatus of claim 1 further comprising:

a hydraulic motor for each of said conveyors for driving the same;

a hydraulic cylinder operable to move said lay down unit between an upright disposition and an inclined disposition; and a pneumatic control circuit for sequencing the operation of said motors and said cylinder to produce automatic operation, said pneumatic control circuit providing for remote control of the unloading operation.

3. The apparatus of claim 1 further comprising:

an accelerator wheel disposed proximate the discharge point of said inclined conveyor to pull the lead coop of the tier of coops on said conveyor away from trailing coops and tilt the coop over at the discharge point.

4. The apparatus of claim 1 further comprising:

a coop elevator conveyor disposed between said coop supporting means and said coop reorienting means for transporting each coop therebetween.

5. The apparatus of claim 4 wherein said coop supporting means comprises:

a saddle portion for supporting a coop such that the coop door is free to open; and an inclined slide portion adjacent said saddle portion, said slide portion being so configured that the coop door will remain open as it moves down the slide.

6. The apparatus of claim 1 wherein said input conveyor system comprises:

an infeed conveyor for advancing a plurality of tiers of poultry coops arranged in single file thereon, and a separation conveyor aligned with said infeed conveyor to receive the tiers of coops fed to it from said infeed conveyor, said separation conveyor moving at a greater rate of speed than said infeed conveyor to separate the lead tier away from the remaining incoming tiers of coops; and wherein said lay down unit comprises:

an L frame for receiving the lead tier of poultry coops from said separation conveyor, said L frame being mounted for pivotal movement between an upright position and a reclining position to forwardly tilt the tier of coops, and a hydraulic cylinder for pivoting said L frame.

7. The apparatus of claim 6 further comprising control apparatus for sequencing the operation of said conveyors and said lay down unit, said control apparatus comprising:

a remote control start/stop control device for enabling operation of the conveyors and lay down unit;

a first control device proximate said separation conveyor for sensing the presence of the lead tier of coops thereon and producing a signal to control the running of the infeed conveyor;

a second control device proximate the lay down unit for sensing the presence of a tier of coops on said lay down unit and producing a signal to initiate movement of the lay down unit into the inclined disposition;

a third control device for sensing movement of the lay down unit from the upright disposition and producing a signal that stops the running of the separation conveyor;

a fourth control device for sensing that the lay down unit is in the inclined position and producing a signal that activates the inclined conveyor; and a fifth control device for sensing the delivery of all coops in a tier to the saddle portion of the coop supporting means and for producing a signal to initiate movement of the lay down into the upright position.

8. The apparatus of claim 7 wherein said control apparatus includes a pneumatic circuit and said control devices are limit valves.

9. An apparatus for receiving tiers of poultry coops and automatically handling each coop, which has a door and contains live birds, to empty the birds from each coop individually, comprising:

a hydraulic motor driven infeed conveyor for receiving and horizontally advancing a plurality of tiers of poultry coops arranged in single file thereon;

a hydraulic motor driven separation conveyor aligned with said infeed conveyor for receiving the tiers of coops fed to it from said infeed conveyor, the motor of said separation conveyor driving the separation conveyor at a greater rate of speed than said infeed conveyor to separate the lead tier away from the remaining incoming tiers of coops;

an L frame for receiving the lead tier of poultry coops from said separation conveyor, said L frame being mounted for pivotal movement between an upright position and a reclining position to forwardly tilt the tier of coops;

a hydraulic cylinder for pivoting said L frame;

a hydraulic motor driven inclined conveyor disposed to receive and support thereon the tier of coops after being forwardly tilted by said L frame and carry the same to the upper end of said inclined conveyor;

an accelerator wheel disposed proximate the upper end of said inclined conveyor to pull the lead coop on said inclined conveyor away from trailing coops and further tilt the coop as it falls over the end of the inclined conveyor;

means for accepting each coop as it falls over the end of said inclined conveyor, said means including a saddle for supporting the coop in an orientation that will cause the coop door to open and the birds to empty from the coop;

a coop elevator;

means for urging the coop from said saddle and onto said coop elevator, with the door of the coop being closed in response to movement of the coop onto said coop elevator;

a coop inverter at the end of said coop elevator for turning the coops over to be topside up; and a pneumatic control circuit having a plurality of limit valves for controlling the running of said hydraulic motors and the movement of said hydraulic cylinder to sequence the operation of said conveyors and said lay down unit.

* * * * *

UNITED STATES PATENT OFFICE
CERTIFICATE OF CORRECTION

Patent No. 4,242,029            Dated December 30, 1980

Inventor(s)    Harry J. Musgrave

It is certified that error appears in the above-identified patent and that said Letters Patent are hereby corrected as shown below:

Col. 8, Line 20 - "7" should read -- 6 --.

Col. 8, Line 60 - "9" should read -- 7 --.

Col. 8, Line 62 - "8" should read -- 6 --.

Signed and Sealed this

Twenty-eighth Day of April 1981

[SEAL]

Attest:

RENE D. TEGTMEYER

Attesting Officer      Acting Commissioner of Patents and Trademarks